United States Patent
Wakuda et al.

(10) Patent No.: US 7,422,113 B2
(45) Date of Patent: Sep. 9, 2008

(54) BATTERY CONTAINER CASE

(75) Inventors: Nobuyuki Wakuda, Shizuoka (JP); Hiroshi Shibata, Shizuoka (JP)

(73) Assignee: FDK Energy Co., Ltd., Shizuoka (JP)

( * ) Notice: Subject to any disclaimer, the term of this patent is extended or adjusted under 35 U.S.C. 154(b) by 126 days.

(21) Appl. No.: 11/490,279

(22) Filed: Jul. 20, 2006

(65) Prior Publication Data

US 2007/0020512 A1 Jan. 25, 2007

Related U.S. Application Data

(63) Continuation of application No. PCT/JP2005/000287, filed on Jan. 13, 2005.

(30) Foreign Application Priority Data

Jan. 23, 2004 (JP) ............................. 2004-015709

(51) Int. Cl.
*B65D 85/88* (2006.01)

(52) U.S. Cl. .................. 206/705; 206/560; 220/507

(58) Field of Classification Search .................. 206/703, 206/704, 705, 443, 507, 560, 775, 776; 220/507
See application file for complete search history.

(56) References Cited

U.S. PATENT DOCUMENTS

| | | | |
|---|---|---|---|
| 5,670,268 A | * | 9/1997 | Mancusi .......................... 429/9 |
| 5,823,350 A | * | 10/1998 | Ward ............................ 206/705 |
| 5,947,297 A | * | 9/1999 | Aoki et al. .................... 206/705 |
| 5,989,205 A | * | 11/1999 | Pond et al. ....................... 604/3 |
| 6,902,062 B1 | * | 6/2005 | Kumakura et al. .......... 206/703 |

FOREIGN PATENT DOCUMENTS

| | | |
|---|---|---|
| JP | 59-67857 U | 5/1984 |
| JP | 5-205713 A | 8/1993 |
| JP | 2001-213446 A | 8/2001 |
| JP | 2003-205933 A | 7/2003 |

* cited by examiner

*Primary Examiner*—Jacob K Ackun, Jr.
(74) *Attorney, Agent, or Firm*—Harness, Dickey & Pierce, P.L.C.

(57) ABSTRACT

A battery container case comprises an ensemble storage section 21 having made and arranged therein plural holder holes 231 that hold individually respectively cylindrical batteries 10 upright in such a way that they are half fitted into the holder holes; an open/close lid 22 that covers the batteries in the ensemble storage section from above; and a restraint member 31 for each holder hole that hinders a respective one of the batteries from being taken out of the holder hole. Each restraint member 31 is fixed to the ensemble storage section in such a disposable manner that it is removable irreversibly.

13 Claims, 10 Drawing Sheets

BATTERY CONTAINER CASE

The present application claims priority from Japanese Patent Application No. 2004-15709 filed on Jan. 23, 2004, which is herein incorporated by reference.

BACKGROUND OF THE INVENTION

1. Field of the Invention

The present invention relates to a battery container case that is used to pack a plurality of cylindrical batteries as a whole for the purpose of pack sale and is reusable by the customer side.

2. Description of the Related Art

Cylindrical batteries such as LR6 (size AA) are often on sale in the form of a pack having a predetermined number of them packed therein. In these days, with the kinds and numbers of battery-powered apparatuses increased, general customers who buy such batteries often buy them in bulk and in the form of the pack mentioned above because it is likely to be convenient to have a plurality of batteries in stock.

As the form of the pack, shrink packs and blister packs are widely used (refer, for example, to Japanese Patent Laid-Open Publication No. 2001-110384). The shrink packs are packs having a predetermined number of batteries packed with a heat-shrinkable resin film, and when taking out a battery, the film is broken thereby opening the pack. The blister packs are packs wherein a mount such as a cardboard is stuck to a plastic thin board (blister) having recesses formed therein and batteries are contained in closed spaces formed by the mount and the recesses.

Those packs are fundamentally thrown away after opening them and taking out batteries, and cannot be used to re-contain batteries that have been taken out. That is, those are disposable packages that are not for re-use. If reused, their function, e.g., usability as a battery container will be greatly reduced. Furthermore, the packs in the above forms are appropriate to pack a relatively small number of, e.g. two or four, batteries as whole. It is not that a plurality of batteries cannot be packed as whole, but there is the problem that opening the pack to take out a first battery causes the containing function to be lost or greatly reduced for the remaining batteries.

Accordingly, where a plurality of batteries are packed as a whole, not the disposable packages but box-shaped cases made of a cardboard or a resin thin board are often used. If batteries are arranged and contained upright in the box-shaped case, they can be contained in plurality, efficiently and in an orderly manner. Even if opened, the pack keeps its function as a container case and hence is suitable to re-contain batteries that have been taken out.

Although being reusable as a container case even after opened, the box-shaped case has the following problems in terms of use as a container case for batteries. That is, the box-shaped case can contain a plurality of batteries in a group, but if used-up batteries are contained in the battery case, they will not be distinguishable from unused batteries. Hence, a trouble occurs when a new battery is needed due to a battery being dead.

In this case, by obeying the rule that used-up batteries taken out cannot be returned to the battery case, the above trouble can be avoided. However, it is strictly required from the viewpoint of environmental protection for the customer side to keep used-up batteries without losing them and bring to a predetermined collecting station when the quantity of them reaches a certain number. Accordingly, a battery case is newly needed to collect and manage used-up batteries. However, it is cost to customers to provide a battery case dedicated for collection.

A simple means to identify new batteries is to attach a seal, a so-called virgin seal, to each battery. However, with this method, the battery price is increased and also there is not a little possibility that a trouble due to the mistake of customers forgetting to take away the seal may occur. Hence, this method is hardly used for most of batteries that are in the market, especially, ones that are on sale on a pack-of-batteries basis, while being used for some of batteries that are on sale on a single battery basis.

SUMMARY OF THE INVENTION

The present invention was made in view of the above technological background. An object thereof is to provide a battery container case that can be applied effectively to products in the form of a pack of plural cylindrical batteries, that enables to distinguish easily and reliably between unused and used-up batteries together contained therein, and that enables customers who bought the pack of batteries to use it both for storing new batteries and for collecting and managing used-up batteries.

According to the present invention, there is provide a battery container case (1) comprising an ensemble storage section having made and arranged therein plural holder holes that hold individually respectively cylindrical batteries in such a way that they are fitted up to a midway point of their length into the holder holes with the rest left outside; and a restraint member for each of the holder holes that hinders a respective one of the batteries from being taken out of the holder hole. Each of the restraint members is fixed to the ensemble storage section in such a disposable manner that it is removable irreversibly and thereby has a seal function to identify used/unused of a respective one of the batteries.

In the battery container case (1), it is preferable (2) that the restraint members are arranged and fixed in such a way as to cover electrode terminals of the cylindrical batteries respectively.

It is preferable (3) that the ensemble storage section has made and arranged therein plural holder holes that hold the cylindrical batteries upright respectively.

It is preferable (4) that the ensemble storage section is formed by a rectangular box having a top panel, a bottom panel, and side panels, and the top panel has openings of the holder holes in plurality made and arranged therein, and the bottom panel has formed and arranged therein concaves to position bottoms of the cylindrical batteries half fitted into the holder holes.

It is preferable (5) that the battery container case further comprises an open/close lid that covers the batteries in the ensemble storage section.

It is preferable (6) that the open/close lid is a transparent lid.

It is preferable (7) that a single resin thin board is bent and assembled into the ensemble storage section and the open/close lid.

It is preferable (8) that the resin thin board is bent into the ensemble storage section and the open/close lid, and by fitting together cylindrical convexes and cylindrical concaves formed in the resin thin board, surface panels of the container case bent orthogonal to each other are joined together, thereby assembling the resin thin board into a predetermined solid structure, and that at least one of the surface panels, on which pressing force is exerted in a direction along its surface when fitting together the cylindrical convexes and concaves, is selectively reinforced with a rib formed along an acting direction of the pressing force.

It is preferable (9) that the restraint member is transparent and shaped like a cap that covers part, outside the holder hole, of the cylindrical battery held in a half-fitted state in the holder hole.

It is preferable (10) that the restraint members are formed like caps from the top panel by selectively expanding it, and in association with the forming, the openings of the holder holes are made, and annular parts along the edges of the openings are formed as thinner or notched portions easy to break.

It is preferable (11) that the top of the cap-shaped restraint member has a slit that surrounds half-circularly a convex electrode terminal of the cylindrical battery.

It is preferable (12) that the restraint member is a tap-like sheet and straddles the top of the cylindrical battery held in a half-fitted state in the holder hole, and both its ends are fixed to the ensemble storage section in such a way that it is irreversibly removable.

It is preferable (13) that the restraint member is a cross-shaped sheet and the intersection of the cross covers the top of the cylindrical battery, and each end of the cross is fixed to the ensemble storage section in such a way that it is irreversibly removable.

It is preferable (14) that the restraint member is formed such that at least its part takes on a different color and/or pattern from those of its neighbors.

According to the present invention, there is provided a battery container case that can be applied effectively to products in the form of a pack of plural cylindrical batteries, that enables to distinguish easily and reliably between unused and used-up batteries together stored therein, and that enables customers who bought the pack of batteries to use it both for storing new batteries and for collecting and managing used-up batteries.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

At least the following matters will be made clear by the explanation in the present specification and the description of the accompanying drawings.

Figure 1:
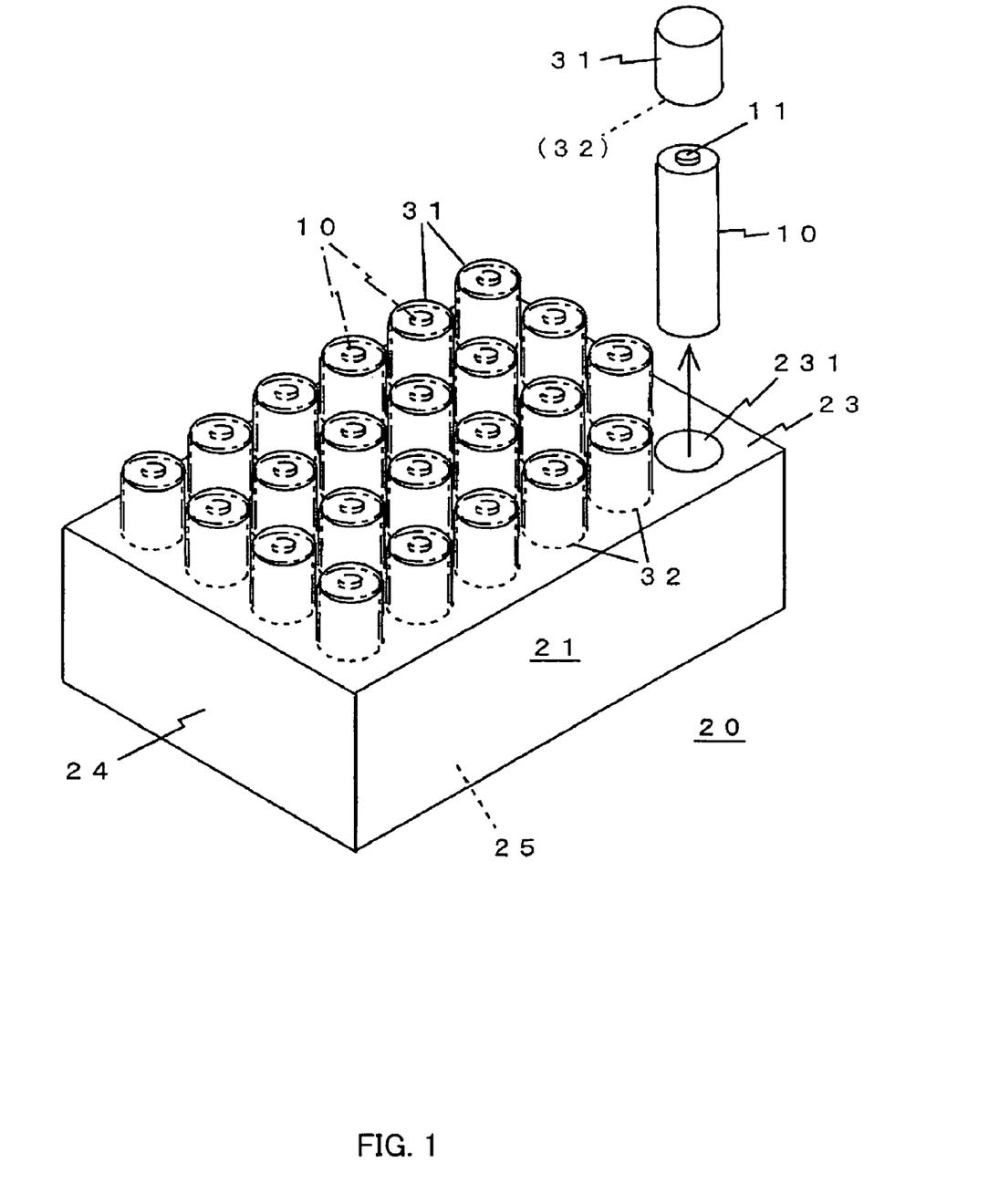
FIG. 1 is a perspective view illustrating an embodiment of a battery container case according to the present invention.

FIG. 1 illustrates an embodiment of a battery container case according to the present invention. The battery container case 20 of the Figure is mainly constituted by an ensemble storage section 21. This ensemble storage section 21 has made and arranged therein a plurality of holder holes 231 that hold individually cylindrical batteries 10 upright in such a way that they are fitted up to a midway point of their length into the holes with the rest left outside.

Each holder hole 231 is provided with a restraint member 31 to hinder the battery 10 held in a half-fitted state from being taken out. Each restraint member 31 is fixed to the ensemble storage section 21 side. The fixing is performed in such a disposable manner that it cannot be re-fixed after removed, which is irreversible. Thus, each restraint member 31 forms a so-called virgin seal, a seal function to identify the used/unused of the battery.

The ensemble storage section 21 is a rectangular box formed of a top panel 23, side panels 24, and a bottom panel 25. The top panel 23 forming the top of the box (ensemble storage section 21) has openings of the holder holes 231 in plurality arranged in a matrix therein. A battery 10 is held and contained upright in each holder hole 231.

Figure 2:
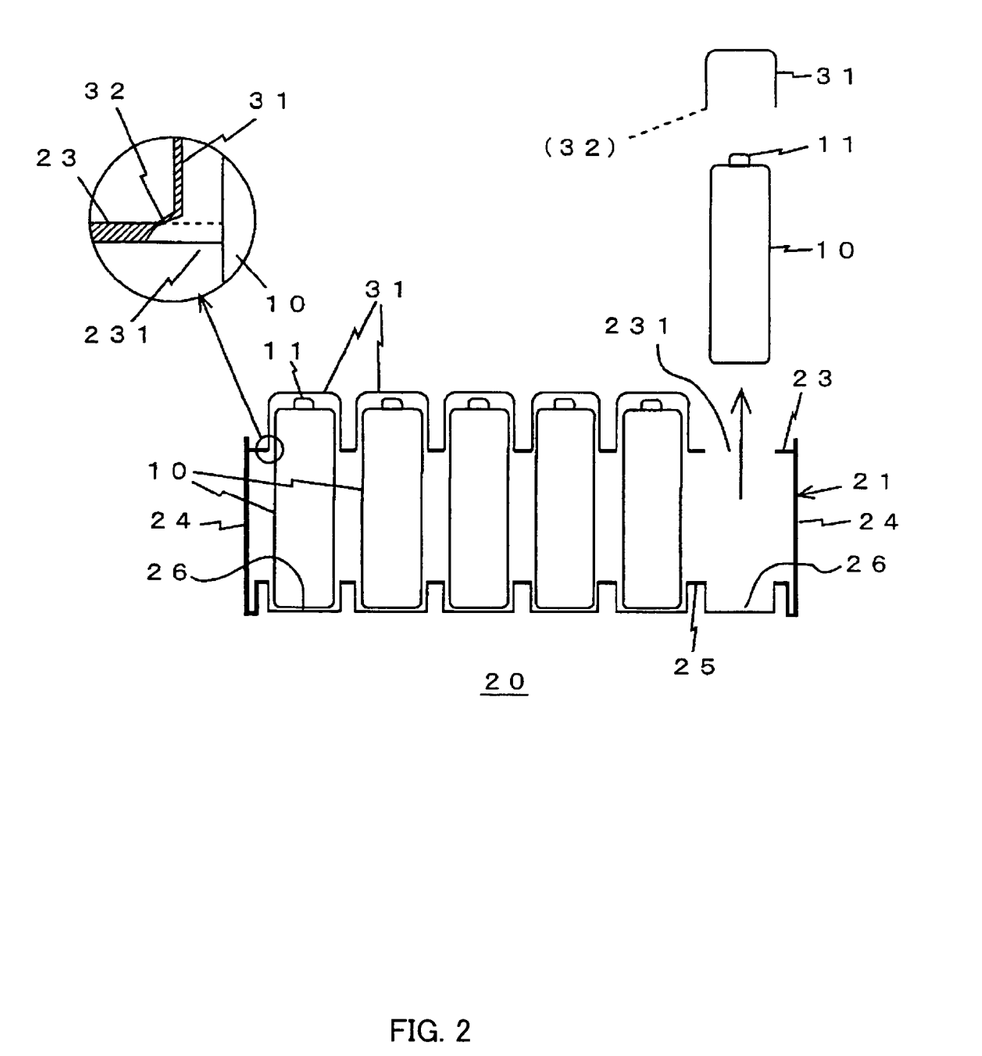
FIG. 2 is a sectional view of part of an ensemble storage section.

FIG. 2 is a longitudinal sectional view of the battery container case 20. As shown in the Figure, concaves 26 are formed in the bottom panel 25 which position the bottoms of the batteries 10 half fitted into the holder holes 231.

The box forming the ensemble storage section 21 is formed by bending a transparent resin thin board along folds. The concaves 26 are formed integrally with the bottom panel 25 by molding process such as vacuum molding. The batteries 10 half fitted into the holder holes 231 have their bottoms fitted in the concaves 26 to be positioned, thus being stably held upright.

The restraint member 31 is shaped like a transparent cap which covers part, outside the hole, of the battery 10 half fitted and held upright in the holder hole 231. The cap-shaped restraint members 31 are formed by selectively expanding the top panel 23. In association with this forming, the openings of the holder holes 231 are formed. The expanding process is implemented by vacuum molding or the like.

The cap-shaped restraint members 31 are fixed to the top panel 23, covering electrode terminals 11 of the cylindrical batteries 10. An annular part along the boundary between the cap-shaped restraint member 31 and the top panel 23 is formed as a breakage guiding line 32 such as a thinner or notched portion that is easy to break. Hence, the cap-shaped restraint members 31 are fixed to the ensemble storage section 21 in such a disposable manner that, although easy to remove, they cannot be restored after removed.

A new battery 10 held in a holder hole 231 can be taken out after the restraint member 31 is removed as shown in FIGS. 1 and 2. The restraint member 31 can be easily removed as mentioned above but, the removal being irreversible, cannot be restored after removed. Therefore, holder holes 231 having their restraint members 31 removed indicate that new batteries 10 which were held therein have already been taken out.

Figure 3:
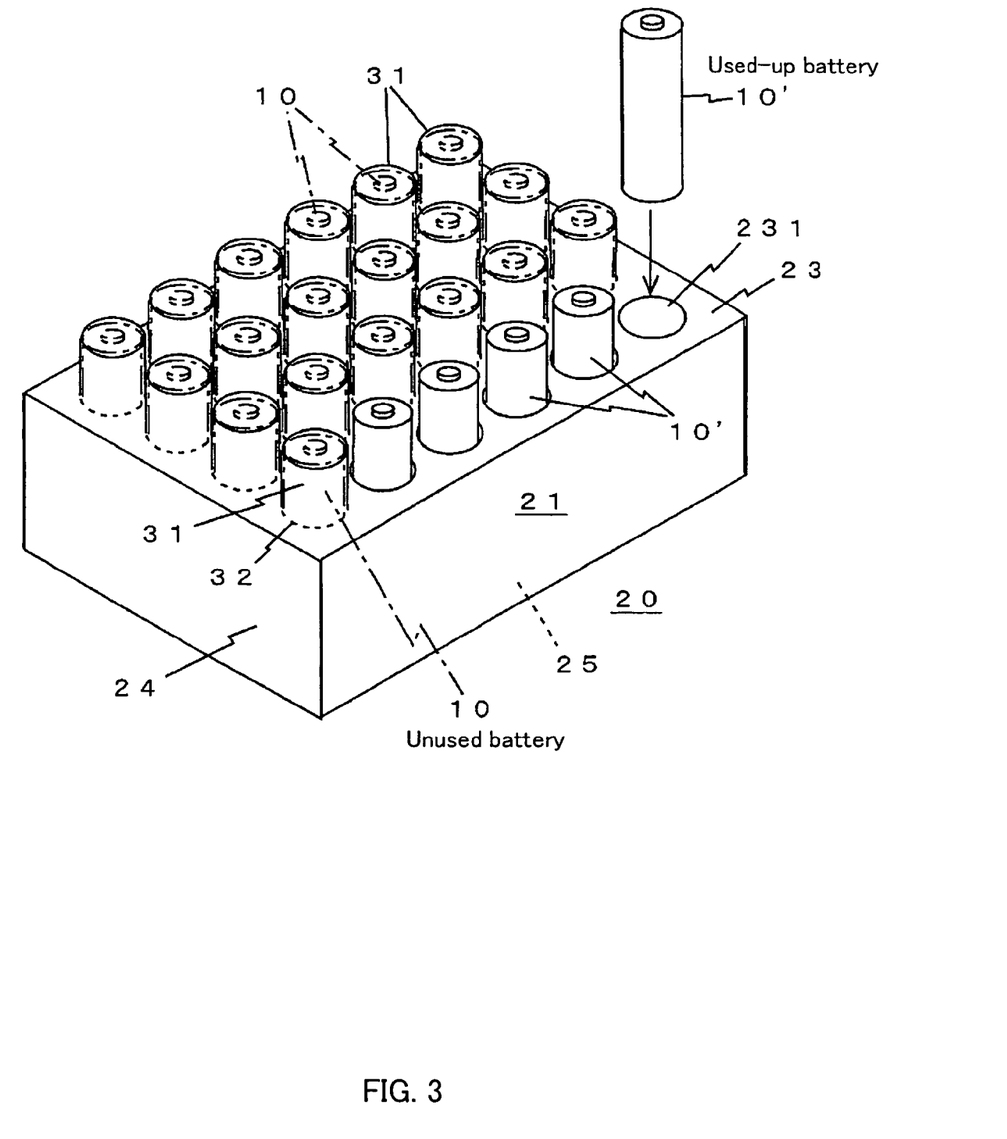
FIG. 3 is a perspective view illustrating a state where new batteries and used-up batteries are stored together in the ensemble storage section.

FIG. 3 shows a state where new batteries 10 and used-up batteries 10' are stored together in the ensemble storage section 21. As shown in the Figure, holder holes 231 having their restraint members 31 removed to take out new batteries 10 can be re-used to store used-up batteries 10'. That is, the ensemble storage section 21 can be used both for storing new batteries 10 and for collecting and managing used-up batteries 10'.

In this case, while new batteries 10 are left in the ensemble storage section 21, new and used-up batteries 10, 10' are stored mixed, but whether or not the restraint member 31 is removed allows to distinguish new ones and used-up ones easily.

If all new batteries 10 that have been stored in the battery container case 20 are replaced with used-up batteries 10', the used-up batteries 10' stored in the battery container case 20 can be carried to a collection station (e.g., the store). That is, the battery container case 20 can also be used as a battery collecting container.

The battery container case 20 having the above configuration can be applied effectively to products which are in the form of a pack of plural cylindrical batteries 10, and enables to distinguish unused, new batteries 10 and re-stored used-up batteries 10' easily and reliably. Thus, customers who bought a pack of batteries can use the battery container case 20 both for storing new batteries 10 and for collecting and managing used-up batteries 10'.

Moreover, the battery container case 20 is good in terms of usability in taking out and re-storing batteries, and enables plural batteries to be put together in an orderly manner and attractively thereby improving the effect of product exhibition, and makes it easy to distinguish new batteries and used-up batteries stored mixed therein.

Figure 4:
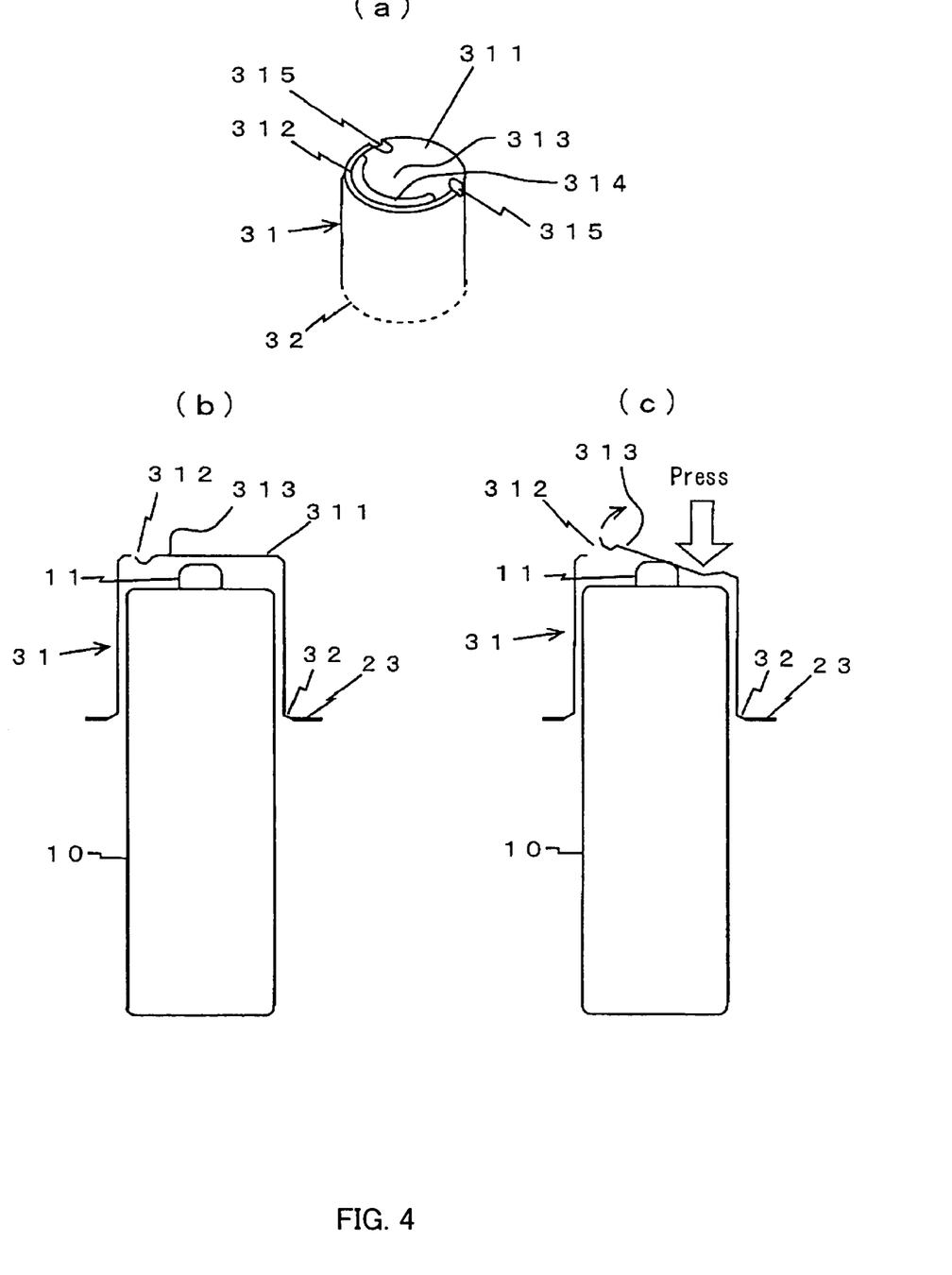
FIG. 4 shows a perspective view (a) and sectional views (b), (c) of an example of the detailed configuration of a restraint member.

FIG. 4 shows an example of the configuration of the restraint member 31. As shown in (a) of the Figure, the restraint member 31 is shaped like a cylindrical cap that covers the top end of the battery 10. A top 311 of this cap (restraint member 31) is provided with a slit 312 that surrounds half-circularly the convex positive terminal 11 of the cylindrical battery 10, and a half-circular lid 313 is formed inwards of the slit 312.

Here, when normal, as shown in (b) of the Figure, the lid 313 is closed and in the same plane as the top 311 is. However, as shown in (c) of the Figure, by pressing down a portion of the top 311 symmetrical with the slit 312 with respect to its center, the lid 313 hits the edge of the convex positive terminal 11 and the other side of the lid 313 is lifted. By pinching and pulling up the lifted lid 313, the restraint member 31 can be easily removed at the breakage guiding line 32.

Each end of the slit 312 is terminated by a concave 315 leading to the other side of the top 311. The lid 313 is bent at or near the line joining the concaves 315 and lifted up. A half annular rib 314 protruding further down or back than the lid 313 is formed along the inward side of the slit 312. This rib 314 is suitable to pinch when pulling up the lid 313.

Figure 5:
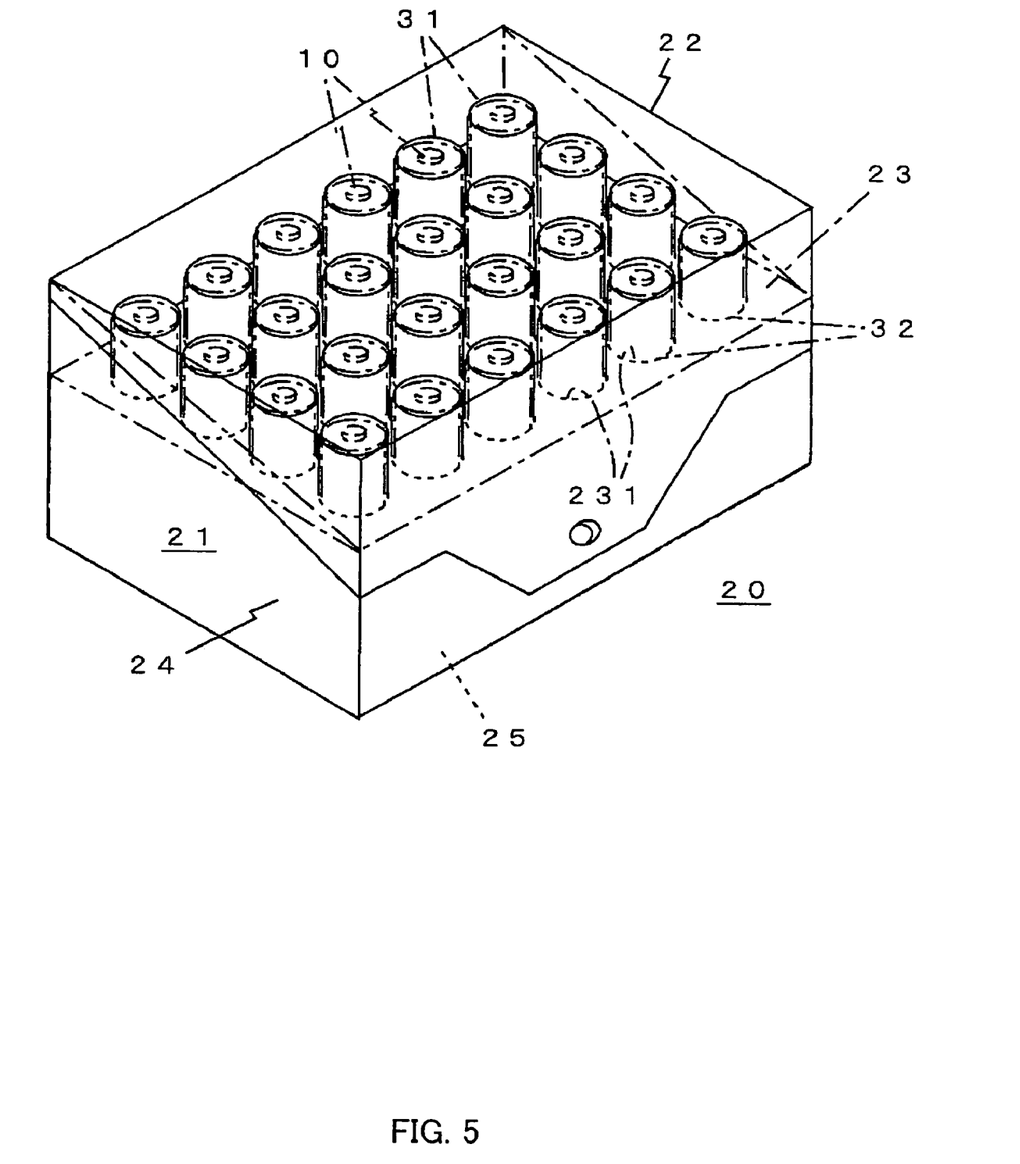
FIG. 5 is a perspective view illustrating an embodiment with a lid of the battery container case according to the present invention.

FIG. 5 shows an embodiment in which an open/close lid 22 is provided for the ensemble storage section 21. As shown in the Figure, the battery container case 20 is preferably a combination of the ensemble storage section 21 and the open/close lid 22. The open/close lid 22 is provided so as to cover batteries 10 held in the ensemble storage section from above.

The ensemble storage section 21 has made and arranged therein a plurality of holder holes 231 that hold individually cylindrical batteries 10 upright in such a way that they are fitted up to a midway point of their length into the holes with the rest left outside. The open/close lid 22 covers batteries 10 held in the ensemble storage section from above. Each holder hole 231 is provided with a restraint member 31 to hinder the battery 10 held in a half-fitted state from being taken out. Each restraint member 31 is fixed to the ensemble storage section 21 irreversibly and forms a so-called virgin seal, a seal function to identify the used/unused of the battery.

The ensemble storage section 21 is a rectangular box formed of a top panel 23, side panels 24, and a bottom panel 25. The top panel 23 forming the top of the box (ensemble storage section 21) has the openings of the holder holes 231 arranged in a matrix therein. The open/close lid 22 is rotatably coupled to one side of the upper surface (top panel 23) of the box so as to be opened/closed with the one side as an axis. The open/close lid 22 is transparent in such a way that batteries 10 inside can be seen. Hence, while the open/close lid 22 is closed, how plural batteries 10 are stored can be confirmed from outside. Furthermore, it becomes easy for customers to confirm the products and select. Moreover, the appearance that plural batteries 10 are arranged and stored in an orderly manner increases a design effect of making the products look attractive.

Figure 6:
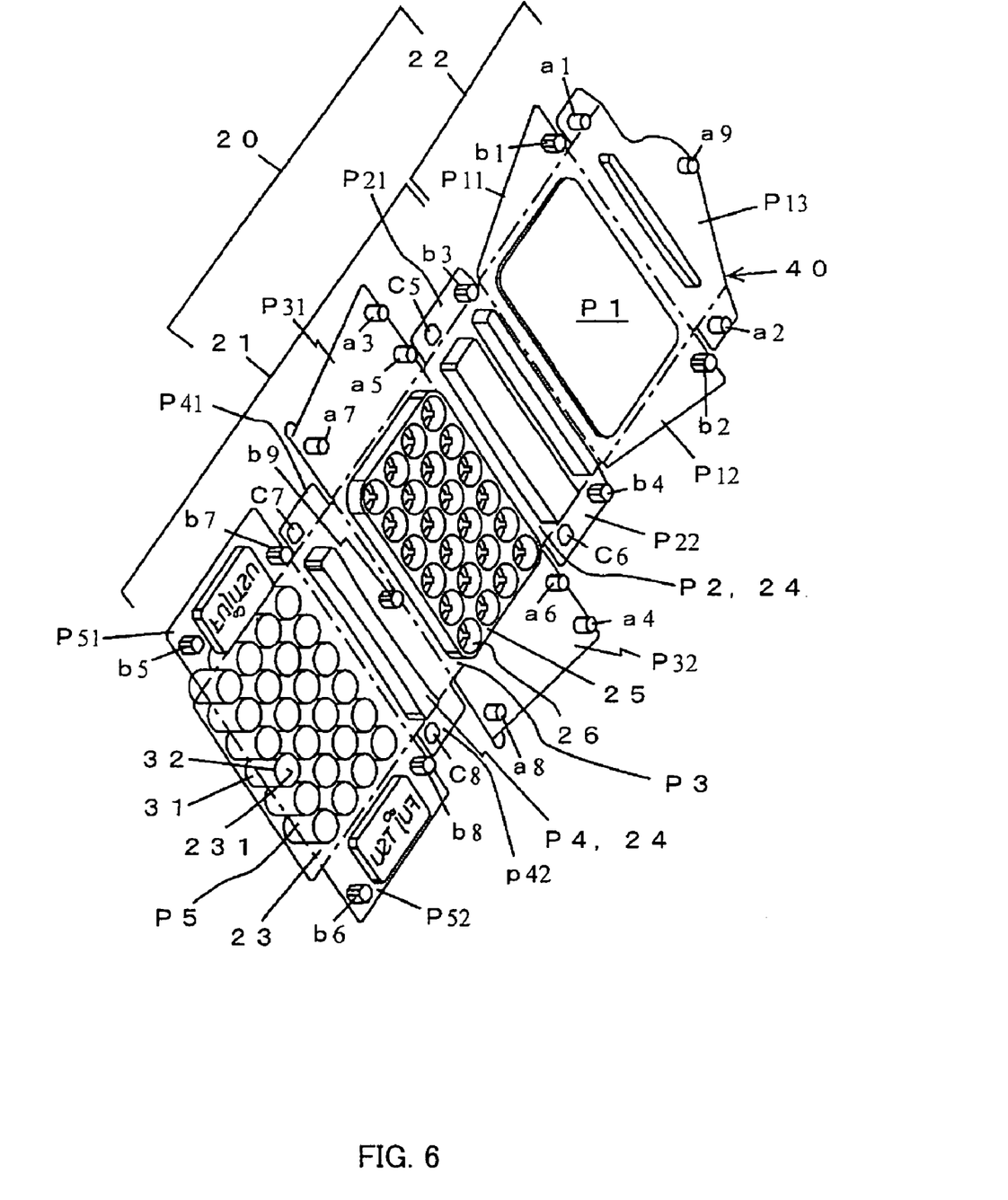
FIG. 6 is a perspective view illustrating a resin thin board which is bent into the battery container case.

FIG. 6 shows a resin thin board 40 which is bent into the battery container case 20 as shown in FIG. 5. A single sheet of the resin thin board 40 as shown in FIG. 6 can be bent into the battery container case 20 having the ensemble storage section 21 and the open/close lid 22. The resin thin board 40 of the Figure is made of transparent resin and formed into a predetermined expanded pattern so that both the ensemble storage section 21 and the open/close lid 22 are assembled by bending the single sheet.

In the Figure, a sheet of the resin thin board 40 is partitioned into the first to fifth main divisions (surface panels) P1 to P5. Sub-divisions P11, P12, P13, P21, P22, P31, P32, P41, P42, P51, and P52 are joined to the main divisions P1 to P5 respectively. By bending the divisions such that adjacent divisions become orthogonal to each other, the battery container case 20 is formed.

The first main division P1 located at one end of the series of the main divisions P1 to P5, together with the three sub-divisions P11 to P13 joined to three sides of the main division P1, forms the open/close lid 22 when they are bent at right angles.

The third main division P3 becomes the bottom panel 25 of the ensemble storage section 21, and the fifth main division P5 becomes the top panel 23 thereof. The third main division P3 that becomes the bottom panel 25 has concaves 26 formed in advance by molding to position the bottoms of cylindrical batteries 10. The fifth main division P5 that becomes the top panel 23 has the holder holes 231 and restraint members 31 formed in advance by molding.

The second and fourth main divisions P2, P4, the sub-divisions P31, P32 joined to opposite sides of the third main division P3, and the sub-divisions P51, P52 joined to opposite sides of the fifth main division P5 form the side panels 24 of the ensemble storage section 21.

The sub-divisions P21, P22 joined to opposite sides of the second main division P2, and the sub-divisions P41, P42 joined to opposite sides of the fourth main division P4 form reinforcing portions of the rectangular box when being laid on the edges of the sub-divisions P31, P32, P51, P52 forming the side panels 24.

Cylindrical convexes a1 to a9 and cylindrical concaves b1 to b9 are formed in the resin thin board 40 in advance by molding. The cylindrical convexes a1 to a9 and cylindrical concaves b1 to b9 form fit-into joints to ensure the battery container case 20 being assembled. In the Figure, a1 and b1, a2 and b2, a3 and b3, a4 and b4, a5 and b5, a6 and b6, a7 and b7, and a8 and b8 each form a pair in which one is fitted into the other, and thereby the divisions orthogonal to each other are securely joined together, thus assembling a predetermined solid structure. Fitting a9 into b9 ensures the open/close lid 22 being closed.

The sub-divisions P21, P22, P41, P42 forming the reinforcing portions of the rectangular box have made therein openings C5, C6, C7, C8 for allowing the cylindrical convexes a5, a6, a7, a8 to fit into the cylindrical concaves b5, b6, b7, b8 respectively.

Figure 7:
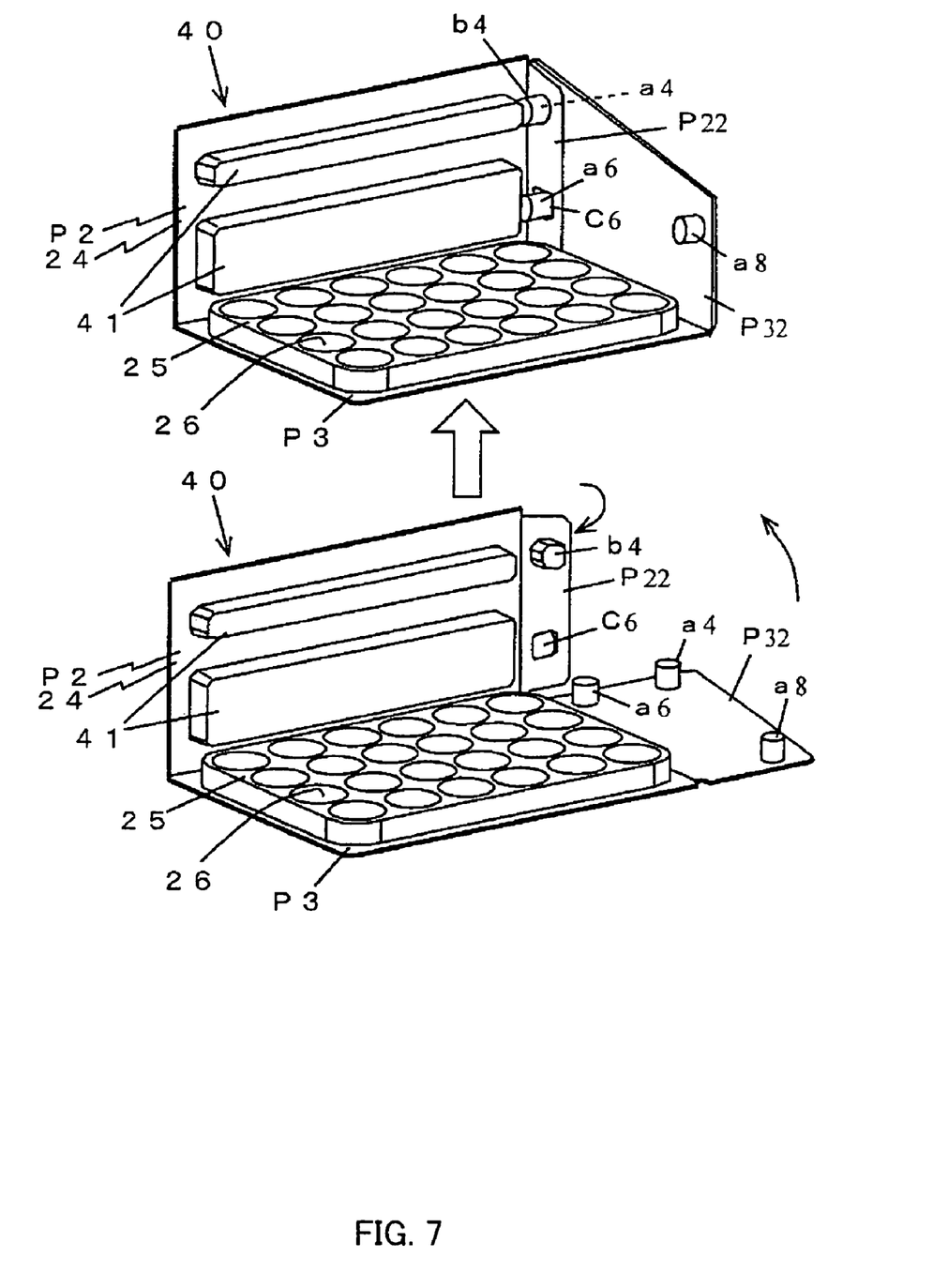
FIG. 7 is a partial perspective view showing the process of bending the resin thin board into a solid structure.

FIG. 7 shows part of the solid structure into which the resin thin board 40 is being bent. As described above, the resin thin board 40 is bent and by fitting together the cylindrical convexes a1 to a8 and the cylindrical concaves b1 to b8, which have been formed in the resin thin board 40 by molding, is assembled into the predetermined solid structure. To strengthen the connection in the assembled structure, the cylindrical convexes a1 to a8 need to be fitted into the cylindrical concaves b1 to b8 tightly, but if fitted together tightly, the thin board 40 bends due to pressing force associated with the fitting, thus hindering the assembly. Accordingly, a special jig is needed to support the thin board 40 against the pressing force so as not to bend when fitting.

However, as shown in the Figure, when the cylindrical convexes a4, a6 are fitted into the cylindrical concaves b4, b6, pressing force is exerted on the division (surface panel) P2 in a direction along its surface. By selectively reinforcing the division P2 with ribs 41 formed along the acting direction of the pressing force, it becomes possible to fit them together with strong pressing force thereby forming high-strength connection without using the above jig.

Although the battery container case 20 has a complex shape having the restraint members 31 and the open/close lid 22, it can be assembled easily and efficiently from a single constituent, i.e., the resin thin board 40 having the above configuration. The resin thin board 40 can be produced in mass from a long resin thin board.

Furthermore, a single sheet of the resin thin board 40 has all elements necessary to form the battery container case 20. That is, the number of constituents necessary to form the battery container case 20 can be one. This is a great advantage in terms of managing the stock and circulation of constituents. Assembling the resin thin board 40 into the battery container case 20 can be achieved by the simple bending described above without a need for expensive equipment for assembly. Therefore, the production cost of the battery container case 20 can be greatly reduced.

Needless to say, assembling from a single sheet of the resin thin board 40 can be applied to a battery container case 20 without the open/close lid 22. In this case, the resin thin board 40 can be simplified in shape and reduced in size by a degree corresponding to the open/close lid 22, and also assembling into a battery container case becomes easier.

Figure 8:
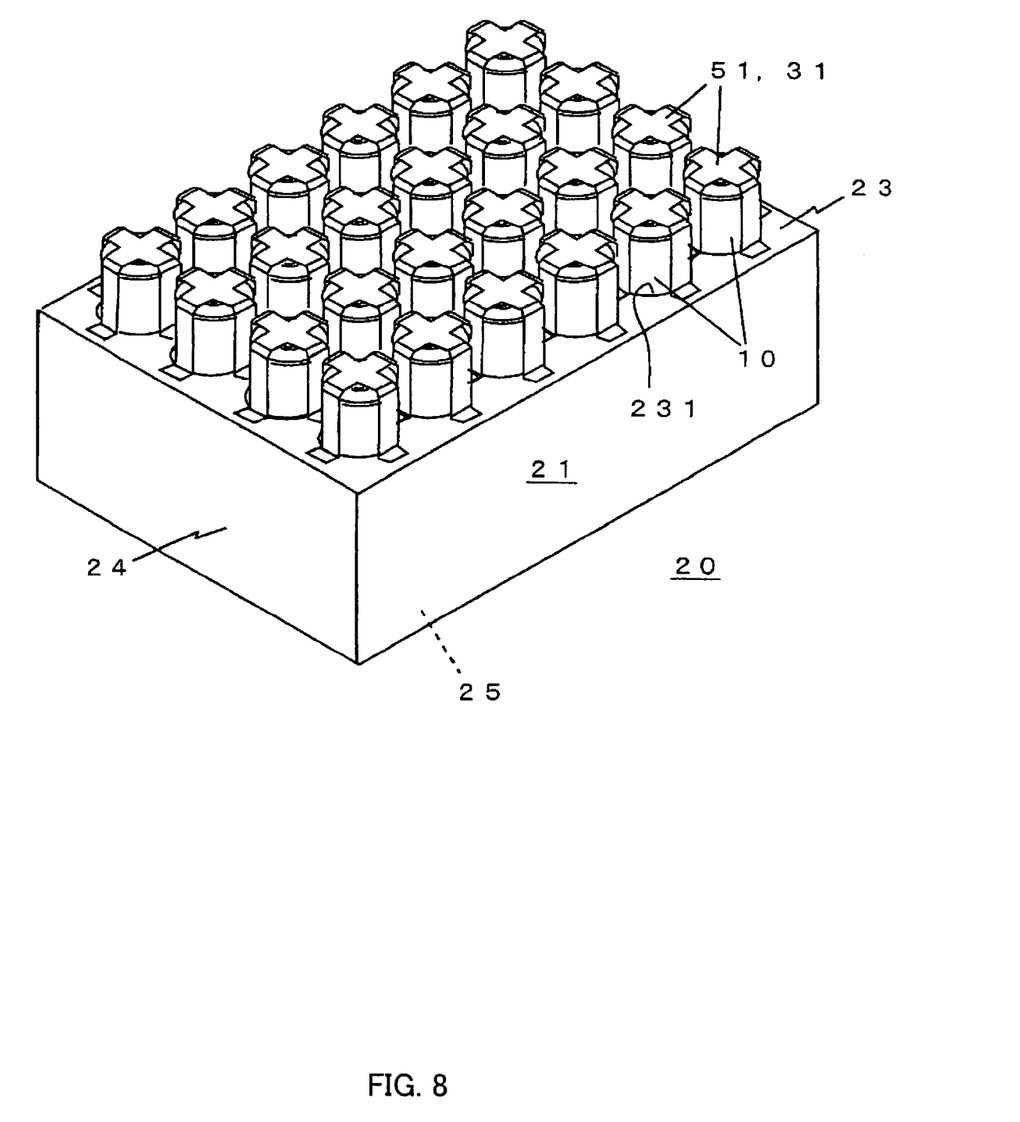
FIG. 8 is a perspective view illustrating another embodiment of the present invention.

FIG. 8 shows another embodiment of the present invention. As shown in the Figure, the restraint member 31 may be formed of a cross-shaped sheet 51. In this case, the intersection of the cross is arranged to cover the top electrode terminal of the cylindrical battery 10, and each end of the cross is fixed irreversibly to the top panel 23 of the ensemble storage section 21.

Figure 9:
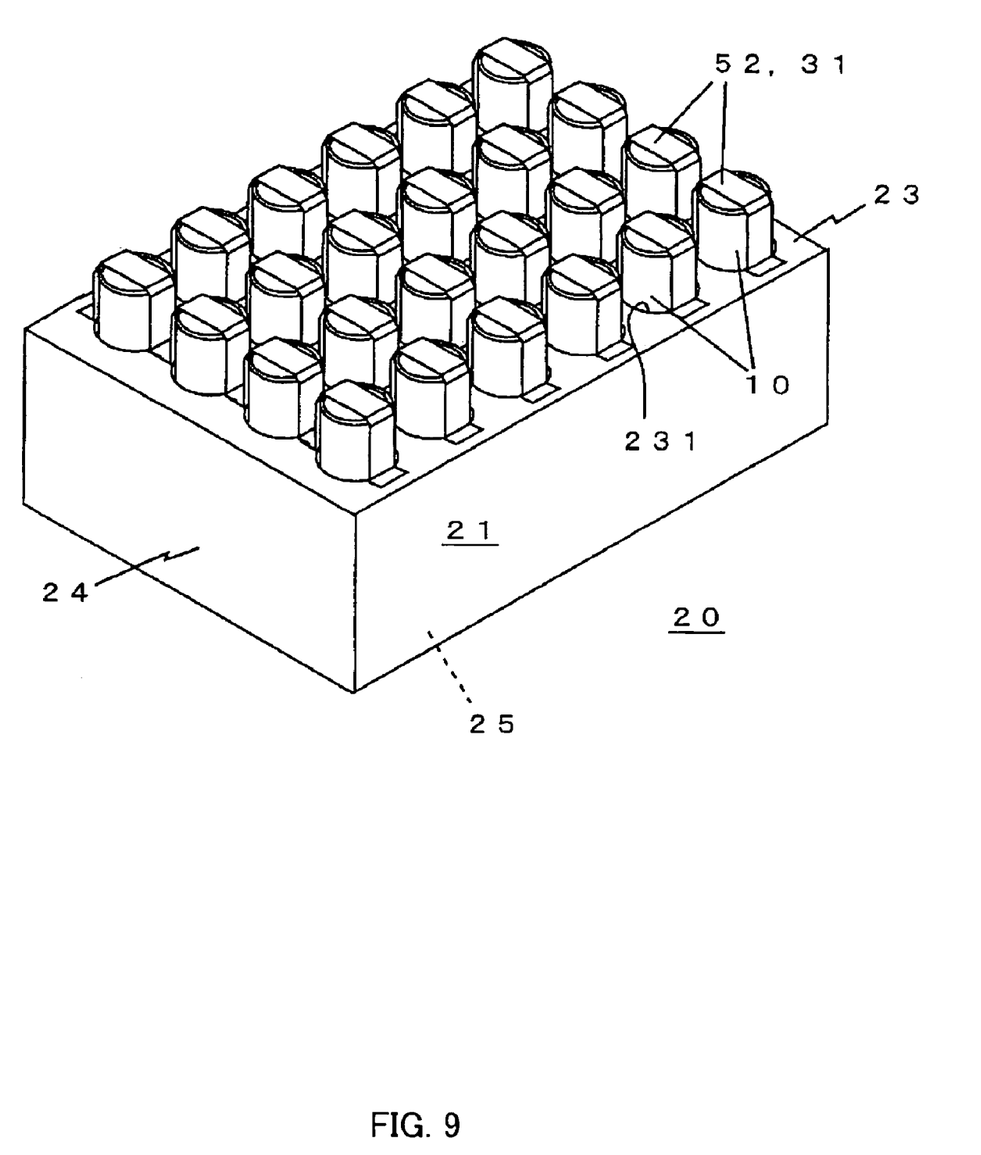
FIG. 9 is a perspective view illustrating yet another embodiment of the present invention.

FIG. 9 shows yet another embodiment of the present invention. As shown in the Figure, the restraint member 31 may be formed of a tape-like sheet 52. In this case, the tape-like sheet 52 is arranged to straddle the top electrode terminal of the cylindrical battery 10, and both ends thereof are fixed irreversibly to the top panel 23 of the ensemble storage section 21.

Figure 10:
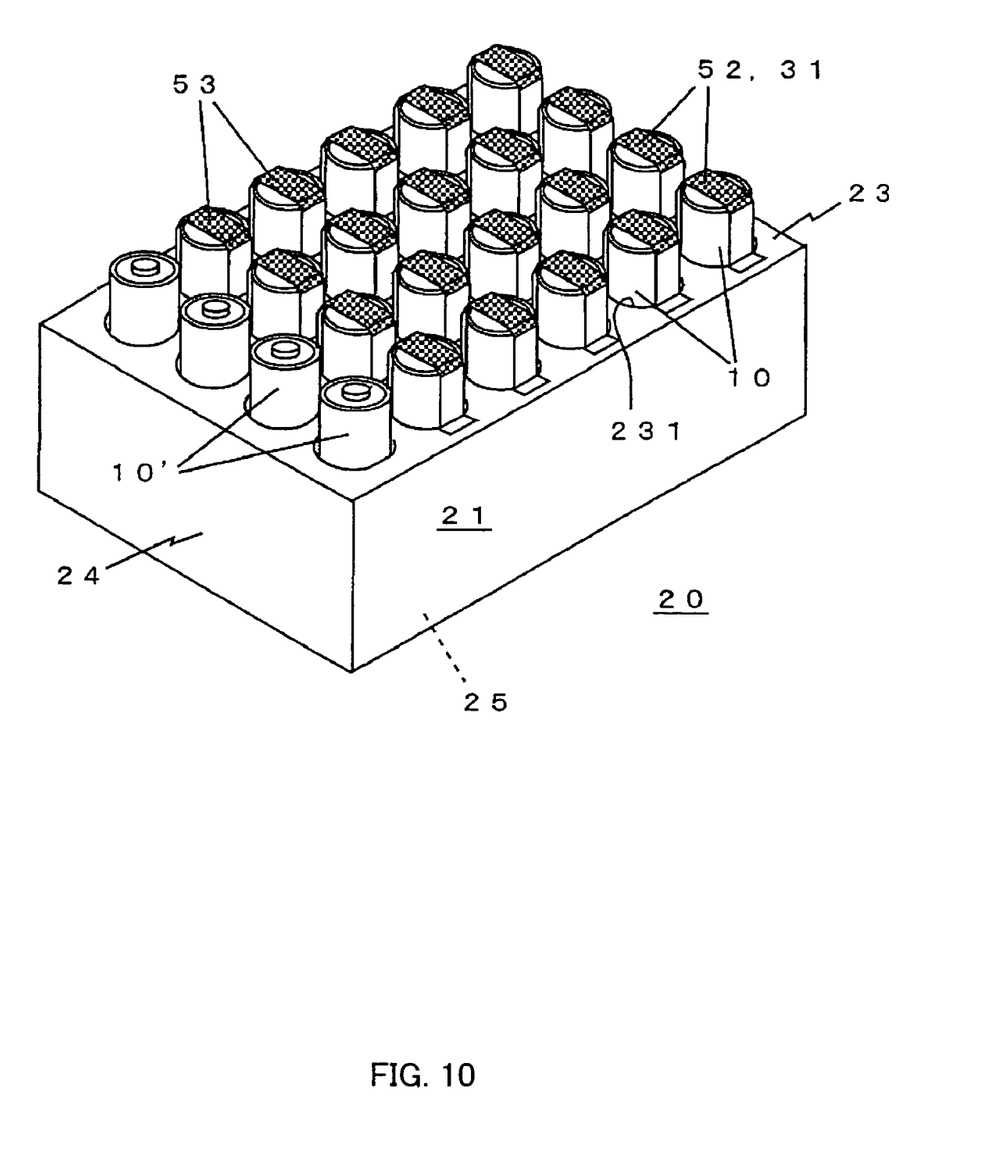
FIG. 10 is a perspective view illustrating an embodiment where restraint members are colored or otherwise marked of the battery container case according to the present invention.

As shown in FIG. 10, the restraint member 31 may be formed such that at least its part takes on a different color and/or pattern from those of its neighbors. In an embodiment shown in FIG. 10, part of the sheet 52 covering of the battery top which tends to receive attention to its appearance is colored of a primary color such as red, the sheet 52 forming the restraint member 31. The reference numeral 53 indicates the colored part. This means enables to distinguish definitely between unused, new batteries and used-up batteries, and provides the products with a design effect of catching the attention of customers.

If necessary, the entire restraint member 31 may be colored. In addition to coloring, a design such as a pattern or a logo may be added. Or, not necessarily being colored red or blue, a pattern such as a checker or a fringe which stands out from the neighbors produces the same effect as the coloring.

Although the present invention has been described by way of exemplary embodiments, various embodiments other than the above ones can be conceived of. For example, the ensemble storage section 21 may be formed of a block of foam resin or the like, and the open/close lid 22 may be, for example, something like a blister. As to how the batteries 10, 10' are held other than the upright position, the storage section may be configured, for example, such that they are fitted into it from the side so as to be held in a lying position. It should be understood that various changes and alterations can be made in the embodiments without departing from the spirit and scope of the invention and that the present invention includes its equivalents.

There is provided a battery container case that can be applied effectively to products in the form of a pack of plural cylindrical batteries, that enables to distinguish easily and reliably between unused and used-up batteries together stored therein, and that enables customers who bought the pack of batteries to use it both for storing new batteries and for collecting and managing used-up batteries.

What is claimed is:

1. A battery container case comprising:
an ensemble storage box having a top panel, a bottom panel and side panels, the top panel having plural holder holes that loosely hold individually respectively cylindrical batteries upright in such a way that the batteries are fitted up to a midway point of their length into the holder holes with the rest left outside above the top panel, the bottom panel having received bottoms of the cylindrical batteries thereon; and
a restraint member for each of the holder holes that hinders a respective one of the batteries from being taken out of the holder hole,
wherein each of the restraint members is fixed to the top panel in such a disposable manner that it is removable irreversibly and thereby has a seal function to identify used/unused of a respective one of the batteries, and the used batteries can be put into the box upright through the holder holes where the restraint members have been removed.

2. The battery container case according to claim 1, wherein the restraint members are arranged and fixed in such a way as to cover electrode terminals of the cylindrical batteries respectively.

3. The battery container case according to claim 1, wherein the ensemble storage box is a rectangular box, and the bottom panel has formed and arranged therein concaves to position bottoms of the cylindrical batteries half fitted into the holder holes.

4. The battery container case according to claim 1, further comprising:

an open/close lid that covers the batteries in the ensemble storage box.

5. The battery container case according to claim 4, wherein the open/close lid is a transparent lid.

6. The battery container case according to claim 4, wherein a single resin thin board is bent and assembled into the ensemble storage box and the open/close lid.

7. The battery container case according to claim 6, wherein the resin thin board is bent into the ensemble storage box and the open/close lid, and by fitting together cylindrical convexes and cylindrical concaves formed in the resin thin board, surface panels of the container case bent orthogonal to each other are joined together, thereby assembling the resin thin board into a predetermined solid structure, and wherein at least one of the surface panels, on which pressing force is exerted in a direction along its surface when fitting together the cylindrical convexes and concaves, is selectively reinforced with a rib formed along an acting direction of the pressing force.

8. The battery container case according to claim 1, wherein the restraint member is transparent and shaped like a cap that covers part, outside the holder hole, of the cylindrical battery held in a half-fitted state in the holder hole.

9. The battery container case according to claim 3, wherein the restraint members are formed like caps from the top panel by selectively expanding it, and in association with the forming, the openings of the holder holes are made, and annular parts along the edges of the openings are formed as thinner or notched portions easy to break.

10. The battery container case according to claim 8, wherein the top of the cap-shaped restraint member has a slit that surrounds half-circularly a convex electrode terminal of the cylindrical battery.

11. The battery container case according to claim 1, wherein the restraint member is a tap-like sheet and straddles the top of the cylindrical battery held in a half-fitted state in the holder hole, and both its ends are fixed to the top panel in such a way that it is irreversibly removable.

12. The battery container case according to claim 1, wherein the restraint member is a cross-shaped sheet and intersection of the cross covers the top of the cylindrical battery, and each end of the cross is fixed to the top panel in such a way that it is irreversibly removable.

13. The battery container case according to claim 1, wherein the restraint member is formed such that at least its part takes on a different color and/or pattern from those of its neighbors.

* * * * *